April 25, 1933.   F. M. GUY   1,906,057
UNIVERSAL JOINT
Filed Sept. 13, 1929
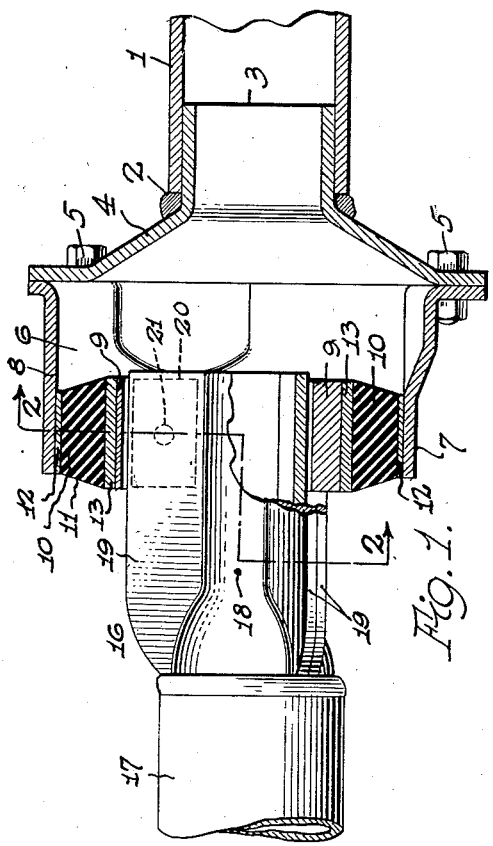
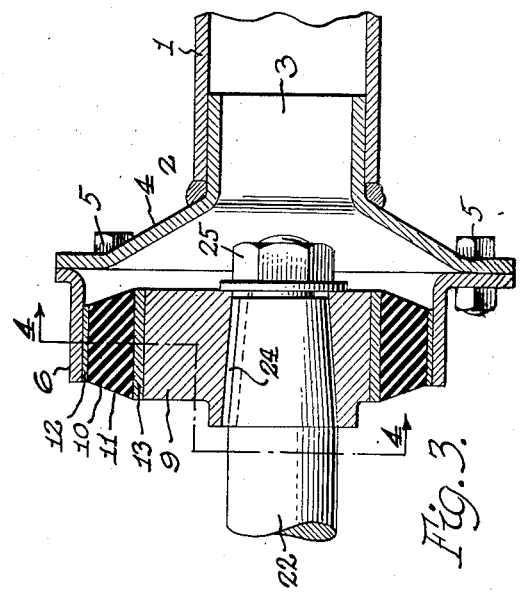
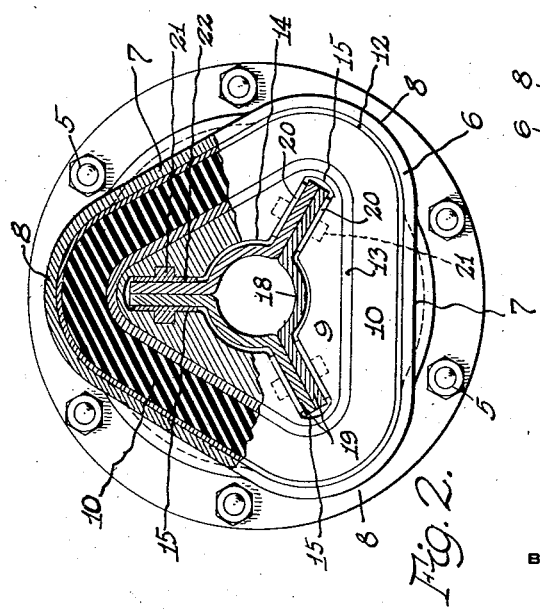
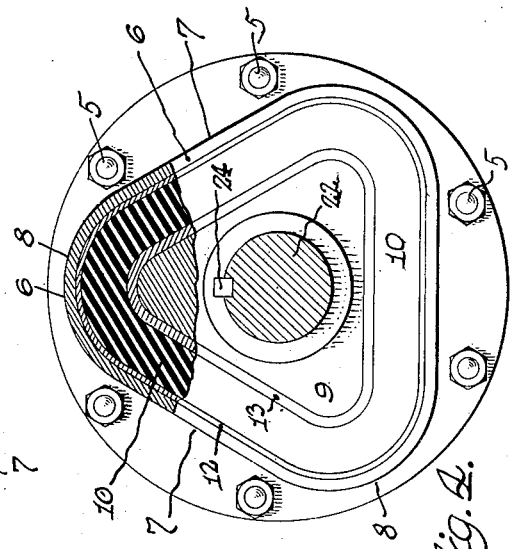
INVENTOR
Frederick M. Guy,
BY
ATTORNEYS Patented Apr. 25, 1933

1,906,057

UNITED STATES PATENT OFFICE

FREDERICK M. GUY, OF DETROIT, MICHIGAN, ASSIGNOR TO GUY-MURTON INCORPORATED, OF DETROIT, MICHIGAN, A CORPORATION OF MICHIGAN

UNIVERSAL JOINT

Application filed September 13, 1929. Serial No. 392,353.

This invention relates to a universal joint of the class in which non-metallic yieldable means is employed to transmit motion from the driving to the driven member of the joint and to permit relative angular movement or dis-alignment of said members, and its object is to provide a construction and arrangement whereby a single non-metallic yieldable member forms the sole connection between driving and driven members, and wherein said member is so shaped and confined as to be compressed by driving torque, thereby relieving the same from external and internal circumferential strains, or strains in the direction of turning movement. A further object is to provide a universal joint of this character which is simple in construction, cheap to manufacture, and efficient in operation, and which embodies certain other new and useful features, all as hereinafter more fully set forth.

With the above and other ends in view, the invention resides in the several matters herein set forth and more particularly pointed out in the appended claims, reference being had to the accompanying drawing in which—

Figure 1 is an axial longitudinal section through a device illustrative of an embodiment of the invention, the driven member of the device being shown in side elevation with parts broken away and in section to more clearly disclose the construction;

Fig. 2 is a transverse section substantially upon the line 2—2 of Fig. 1;

Fig. 3 is a sectional view similar to Fig. 1, showing a modified construction; and Fig. 4 is a section on the line 4—4 of Fig. 3.

As shown in the drawing, 1 indicates a tubular drive shaft which is rigidly secured in any suitable manner as by a weld 2, to the tubular axial portion 3 of a casing head 4. Secured by bolts 5 to this head, is a casing wall 6 which is formed with a plurality of substantially flat portions or sides 7 arranged in angular relation to each other, these flat portions being connected by curved portions 8, thus forming a casing wall which is angular in cross-section, said wall as shown, being of triangular form. Centralized in this casing and evenly spaced from the wall thereof is a metal block 9 shaped externally to conform to the angular shape of the casing wall and within the space between this wall and block is a continuous ring or band 10 of non-metallic resilient material, preferably of rubber composition, the end surfaces 11 of which preferably converge outwardly and this resilient band or block is confined between outer and inner confining rings 12 and 13, said rings being preferably secured as by vulcanization, to the exterior and interior of the resilient band 10, and these rings are so shaped and proportioned that they, with the band interposed, may be forced under pressure into the space between the block 9 and the casing wall to secure the block 9 and resilient ring 10 with its rings 12 and 13 against movement in the casing endwise thereof and hold the same centrally therein with the axis of the block connecting with the longitudinal axis of the casing and drive shaft.

The block 9 is formed with an axial opening 14 therethrough and with slots 15 extending radially from said opening one toward each external corner of the block, and projecting into this central opening and radial slots, and free to slide longitudinally therein, is a head, indicated as a whole by the numeral 16, which head is secured upon the end of the tubular driven shaft 17. This head on the driven shaft comprises a plurality of sheet metal stampings which, when assembled, provide a tubular shank portion to project into and be secured within the end of the tubular driven shaft and also form an axial tubular portion 18 and wings 19 extending radially therefrom to fit loosely within the opening 14 and radial slots 15 in the block 9. Filling the space at each side of each wing 19 between it and the sides of the slots into which the wings project, is a wear plate 20 and each plate is held in place by a stud or projection 21 preferably integral with the plate and projecting into an opening in the block 9.

When a universal joint is installed where it is necessary that the driving and driven shafts move relatively in a longitudinal direction, as when connected with the propeller shaft of a motor vehicle for transmitting power from the engine to the rear axle, the construction shown in Figs. 1 and 2 is employed, but if no such relative longitudinal movement between driving and driven members is necessary, the form of universal joint shown in Figs. 3 and 4 is preferably used, wherein the driven shaft 22 is rigidly secured in any suitable manner to the block 9, as by forming said block with an axial opening to receive the tapered end portion 23 of the shaft, providing a key 24 for keying this end in the opening, and screw threading the end of the shaft which projects beyond the block, to receive a nut 25 which serves to draw the tapered end of the shaft into the tapered opening in the block and rigidly secure the block to the shaft. The shape of the casing 6 and interposed resilient band 10 with its rings 12 and 13 is substantially the same as in the construction shown in Figs. 1 and 2, the use of the winged head 16 on the driven shaft and the wear plates 20 being dispensed with, as there is no relative longitudinal movement of the shaft and block.

In both constructions illustrated, the casing 6 is of angular shape in cross-section and the block 9 has a like angular exterior configuration. Therefore driving torque applied by the driver is transmitted by the interposed resilient band to the driven member in such a manner that there is no tendency to tear the band loose from either the casing or block due to such twisting strains, and the body of rubber is compressed by the torque applied instead of being subjected to internal and external peripheral longitudinal stretching action which would tend, where the casing and block are circular in form, to tear the rubber loose from either the driving or driven members and stretch the rubber longitudinally. When the rubber is confined between two angularly shaped members, the inner can not turn relative to the outer without compressing the rubber due to the angles, and therefore positive anchoring of this rubber to these members is obviated.

The rubber ring 10 is sufficiently flexible to permit relative limited angular movement between driving and driven members, and therefore the shaft 7 or the shaft 22 need not be maintained in perfect longitudinal alignment with the shaft 1, the ring 10 yielding sufficiently to provide for such angularity, particularly as the periphery of said ring 10 is of less width than at its inner diameter due to the outward convergence of the end faces 11 of the ring.

Obviously the metal confining rings 12 and 13 may be dispensed with, but they greatly facilitate the assembly as the rubber may be vulcanized in place between these rings or metal bands prior to assembly with the casing and block, and then this unit comprising the metal bands with the rubber insert vulcanized in place therebetween, may be forced under high pressure into the space between casing wall and center block to which the driven shaft is connected, thereby obviating the necessity for riveting or otherwise firmly securing this unit in place against endwise movement in the casing where it is desirable to prevent such endwise movement, as in the construction shown in Figs. 1 and 2. The cross-sectional angularity of the casing and corresponding angularity of yieldable unit and block, prevents rotation of the block within the casing and in some constructions the arrangement may be such as to provide for relative endwise movement of driving and driven shafts, by permitting the block and yieldable unit carried thereby to have a limited longitudinal movement in the casing. Further, the interior configuration of the casing and corresponding external shape of the block may be of any desired form other than circular, the parts as shown being of triangular shape, but they may be rectangular, hexagonal, octagonal or other angular shape presenting straight or other portions which will cause compression of the rubber when torque is applied.

Other changes in the construction, arrangement and combination of parts may be made within the scope of the appended claims without departing from the spirit of the invention, and I do not, therefore, limit myself to the particular construction shown.

Having thus fully described my invention, what I claim is:

1. In a universal joint, the combination of a casing of internal angular formation in cross-section, a member projecting into said casing, a head on said member within said casing and of exterior angular formation with a continuous space between said head and casing, and a yieldable unit including a rubber band and interior and exterior metal rings with said band vulcanized to said rings, said unit being secured within said space between said casing and head.

2. In a universal joint, the combination of a casing of internal angular formation, a head block in said casing of external angular formation with a space around said head between it and the angular wall of the casing, a non-metallic yieldable band within said space and forming the driving connection between said head and casing, said head being provided with an axial opening, a member formed to engage in said opening in said head block and slide longitudinally therein, and wear plates interposed between said member and walls of said opening.

3. In a universal joint, the combination with a drive shaft and a driven shaft, of a casing secured to one of said shafts and of angular formation in cross-section presenting interior portions arranged in angular relation, a head block in said casing having an exterior form to conform to the interior shape of the casing with a continuous space around said block between it and the opposed surface of the casing, a continuous rubber band, and interior and exterior metal rings secured to said band and conforming to the interior configuration of said casing and the exterior configuration of said head block, said metal rings and rubber band filling said space and being secured therein.

In testimony whereof I affix my signature.

FREDERICK M. GUY.